United States Patent Office 2,715,637
Patented Aug. 16, 1955

2,715,637

PROCESS FOR PRODUCING Δ⁴-3-KETOSTEROIDS AND INTERMEDIATES THEREOF

George Rosenkranz and Carl Djerassi, Mexico City, Mexico, assignors to Syntex S. A., Mexico City, Mexico, a corporation of Mexico No Drawing. Application January 23, 1950,
Serial No. 140,152

14 Claims. (Cl. 260—397.3)

The present invention relates to cyclopentanophenanthrene derivatives and a process for the production thereof. More particularly the present invention relates to iodinated ketosteroids and particularly to 2-iodo-3-ketoallosteroids and 2-iodo-Δ⁴-3-ketosteroids.

The 4-bromo-allosteroids of the normal series do not react with alkali iodides when heated, as for example, in acetone or other ketone solutions for several hours. In accordance with the present invention, however, the surprising discovery was made that the 2-bromo-3-ketosteroids of the allo series readily react with alkali iodides within 1 to 3 hours in acetone or other lower aliphatic ketone solutions to produce the corresponding 2-iodo derivatives. It has been further found, in accordance with the present invention, that when a 2,4-dibromo-3-ketoallosteroid is reacted with an alkali iodide with heating for a relatively short period of time, i. e. less than 3 hours, the product is a 2-iodo-4-bromo-3-ketoallosteroid. On the other hand, when a 2,4-dibromoketoallosteroid is reacted with an excess of alkali iodide in a lower aliphatic ketone solvent for more than 3 hours with heating, the product is a 2-iodo-Δ⁴-3-ketosteroid. Further, it has been discovered, in accordance with the present invention, that in contrast to the 2-bromo-3-ketoallosteroids which are known to undergo dehydrobromination on reaction with a tertiary amine, such as collidine (Butenandt et al., Ber., 72, 1617 (1939), the 2-iodo-3-ketoallosteroids undergo deiodination on boiling with a tertiary amine, such as collidine, dimethylaniline, etc. The resultant products in good yields are the corresponding ring A saturated 3-ketosteroid. Similarly, when the new 2-iodo-Δ⁴-3-ketosteroids are reacted with a tertiary amine, as by boiling in a lower aliphatic ketone solution, the corresponding Δ⁴-3-ketosteroids are produced. A similar effect occurs when the 2-iodo-3-ketoallosteroids or the 2-iodo-Δ⁴-3-ketosteroids are treated with a reducing agent, such as chromous chloride, in acetone solution, or with zinc dust in acetic acid or ethanol solution or treated with other reducing agents such as Raney nickel. In each case the corresponding 3-ketoallosteroid or the corresponding Δ⁴-3-ketosteroids are produced.

In accordance with the present invention, the 2-iodo-4-bromo-3-ketoallosteroids may also be boiled with a tertiary amine, such as collidine, so that a simultaneous dehydrobromination and deiodination occurs to yield the corresponding Δ⁴-3-ketosteroid.

There has therefore been provided a new and generally applicable method for introducing the Δ⁴-3-keto grouping starting with a saturated 3-ketoallosteroid. Inasmuch as the Δ⁴-3-keto grouping is generally to be found in various cortical, androgenic and progestational hormones, the new iodo derivatives of the present invention are extremely desirable hormone intermediates. It is also desired to point out that the iodinated steroids just disclosed are in themselves of interest as therapeutic agents and for the incorporation of radio active iodine, since they may represent iodinated derivatives of the cortical, androgenic and progestational hormones.

The present invention, therefore, is directed to new products which are generally dimethyl cyclopentanoperhydrophenanthrene compounds provided in ring A with a keto group at the 3-position, and further provided with an iodine group at the 2-position. It may be understood that the compounds may be generally otherwise substituted in any of the rings of the cyclopentano nucleus, for example, as previously pointed out derivatives have been prepared in accordance with the present invention wherein an iodine group is provided at the 2-position, a keto group at the 3-position, and a double bond between the 4- and 5-positions. The compounds may be provided with the usual substitutions at the 17-position, such as that occurring in progesterone or in the cortical hormones, and they may also be otherwise substituted in rings B, C and D. In other words, the present invention appears to be applicable to all of the 2-bromo-3-ketosteroids of the allo series, and where, in the present specification and claims, a 2-iodo-3-ketosteroid is referred to, the term is generally applicable to all of the compounds having an iodine group attached to the 2-position of ring A whether or not various other radicals are attached to the various rings, as for example, at the 17-position or in other positions.

The process of the present invention may be carried out generally by dissolving a suitable 2-bromo-3-ketoallosteroid in a suitable solvent, preferably a lower aliphatic ketone, as for example, acetone or methyl ethyl ketone. Thereafter an alkali metal iodide, as for example, sodium iodide or potassium iodide is added and the reaction mixture is boiled for a period of time in excess of approximately one hour. In the case where a mere substitution of the 2-bromo group by a corresponding 2-iodo group is desired, a period of time of the order of one hour is sufficient to quantitatively substitute the iodine for the bromine. On the other hand, where a 2,4-dibromo-3-ketoallosteroid is being treated and it is desired to produce a 2-iodo-Δ⁴-3-ketosteroid, it is desirable to employ an excess of alkali metal iodide and to continue the boiling for at least 3 to 4 hours. Thereafter the solution may be cooled and diluted with water containing a small amount of sodium thiosulfate. The colorless product may then be recrystallized from a suitable solvent, solvents for recrystallization being ethanol or methanol or a mixture of ethanol and chloroform.

As previously pointed out, the 2-iodo grouping may be removed by refluxing the 2-iodo compound with a tertiary amine such as collidine or dimethylaniline. In every case deiodination occurs readily when the 2-iodo-ketosteroid is refluxed with the tertiary amine for a relatively short period as of the order of one-half hour. The steroid product can then be partitioned between ether and dilute mineral acid, such as dilute hydrochloric acid and the organic layer may then be suitably washed with an acid, then sodium carbonate solution and then dried. The steroid product will then be obtained after evaporation of the ether solution. A similar process applied to a 2-iodo-4-bromo derivative results in the 2-iodo-Δ⁴ compound being formed. The 2-iodo-Δ⁴ compound can be similarly treated to prepare the pure unsaturated steroid.

In the alternative, deiodination can be effected by the use of a reducing agent. Thus 2-iodo-ketosteroids, whether or not provided with a double bond between the 4,5 position, can be treated with reducing agents to remove the 2-iodo group. For example, the 2-iodo-steroids may be refluxed with zinc dust in ethanol for a substantial period of time or they may be treated with Raney nickel or with chromous chloride in acetone solution.

The reactions just described may be conveniently indicated by the following equations:

Iodine substitution in 2-position of mono-bromo compounds:

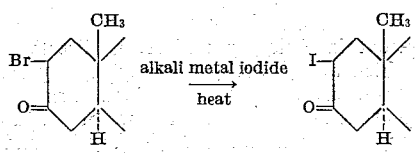

Iodine substitution in 2-position of 2-4 dibromo compounds:

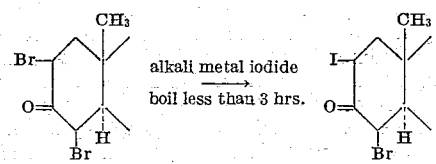

Simultaneous iodine substitution and dehydrobromination of 2-4 dibromo compounds:

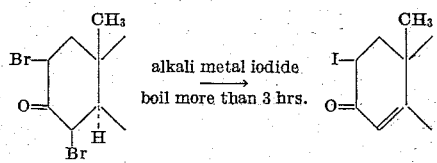

Removal of iodine from mono-iodo compounds with tertiary amines:

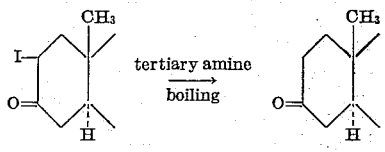

Removal of iodine from 2-iodo-$\Delta^4$ compounds with tertiary amines:

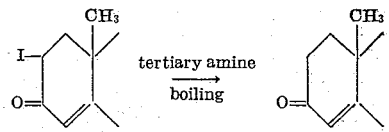

Simultaneous deiodination and dehydrobromination of 2-iodo, 4-bromo compounds with tertiary amines:

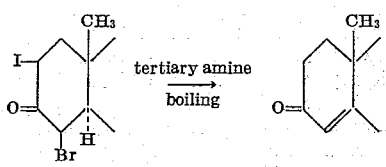

Removal of iodine from mono-iodo compounds with reducing agents:

Removal of iodine from mono-iodo compounds with reducing agents:

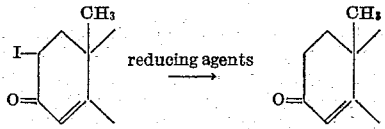

In the above reactions the preferred tertiary amine is collidine, but other tertiary amines such as pyridine and dimethyl aniline have been used. Similarly, although sodium iodide has been found especially suitable as the alkali metal iodide, other alkali metal iodides, such as potassium iodide, are suitable. Reducing agents, in general such as chromous chloride in acetone, zinc dust in acetic acid and/or ethanol and treatment with hydrogen in the presence of Raney nickel catalyst, are also suitable.

In the foregoing equations inasmuch as the present reaction only concerns ring A of the various compounds, only this ring has been indicated.

The above reactions are generally applicable to the production of 2-iodo-3-ketosteroids selected from the group consisting of 2-iodo-3-ketoallosteroids and 2-iodo-$\Delta^4$-3-ketosteroids. In accordance with the processes above outlined 2-iodo derivatives of the cortical, androgenic and progestational hormones may be produced. For example, 2-iodo-testosterone may be produced from 2,4-dibromoandrostan-17-ol-3-one and 2-iodo-testosterone esters may be produced from the corresponding 2,4-dibromoandrostan-17-ol-3-one compounds esterified in the 17-position by means of an organic aliphatic or aromatic acid. Similarly 2-iodo progesterone may be produced from 2,4-dibromoallopregnane-3,20-dione, 2-iodo-desoxycorticosterone from 2,4-dibromoallopregnane-3,20-dione-21-ol and 2-iodo-desoxycortiocosterone esters from the corresponding 21 esters of 2,4-dibromoallopregnane-3,20-dione-21-ol, etc.

The following specific examples serve to illustrate but are not intended to limit the present invention:

*Example I*

4. g. of 2-bromoandrostan-3,17-dione in 100 cc. of acetone was refluxed for approximately three hours with 4.8 g. of potassium iodide, the solution was cooled and diluted with water containing a small amount of sodium thiosulfate. The colorless product was recrystallized from a mixture of ethanol and chloroform, yielding colorless needles of 2-iodoandrostan-2,17-dione having an M. P. 140–144° C. $[\alpha]_D^{20}+78.7°$ (chloroform). Using the same procedure, 2-bromocholestan-3-one was converted to 2-iodocholestan-3-one of M. P. 133–136° C. $[\alpha]_D^{20}+39.9°$ (chloroform).

*Example II*

A solution of 0.8 g. of the 2-iodocholestanone prepared in accordance with Example I was refluxed with 5 cc. of collidine for thirty minutes. After partitioning between ether and dilute hydrochloric acid, the organic layer was washed with acid, sodium carbonate solution, sodium thiosulfate solution and dried. Cholestan-3-one with M. P. 127–129° C. $[\alpha]_D^{20}+44.3°$ (chloroform) in 70% yield was obtained after evaporation of the ether solution. The same procedure applied to the 2-iodoandrostan-3,17-one of Example I yielded androstan-2,17-dione.

*Example III*

A solution of 3 g. of 2,4-dibromoandrostan-17-ol-3-one 17-hexahydrobenzoate in 100 cc. of methyl ethyl ketone was refluxed with 3.6 g. of sodium iodide for fifty minutes. After addition of water and sodium thiosulfate, the product was filtered and recrystallized from acetone yielding colorless crystals of 2-iodo, 4-bromoandrostan-17-ol-3-one 17-hexahydrobenzoate of M. P. 145–149° C. $[\alpha]_D^{20}+13.9°$ (chloroform). This product gave a correct analysis for a monobromo-monoiodo derivative.

*Example IV*

The 2-iodo, 4-bromoandrostan-17-ol-3-one 17-hexahydrobenzoate, product of Example III, was refluxed with collidine for thirty minutes and after working up, as in Example II, there was isolated testosterone hexahydrobenzoate of M. P. 125–127° C. in 50% yield.

*Example V*

A solution of 2 g. of 2,4-dibromoallopregnane-17α-ol-3,20-dione (M. P. 185–187° C. (with decomposition), $[\alpha]_D^{20}$ 0.0° (chloroform) and 2.4 g. of sodium iodide in 70 cc. of acetone was refluxed in a nitrogen atmosphere for sixteen hours. After working up as in Example I and recrystallizing from methanol, there was obtained 2- iodo-17α-hydroxyprogesterone with the following constants: M. P. 110–115° C. (with decomposition), $[\alpha]_D^{20} + 71.0°$ (chloroform).

Among other compounds, which have been prepared by this method, may be mentioned 2-iodo-Δ⁴-androstene-3,17-dione, M. P. 126–129° C. $[\alpha]_D^{20} + 137.6°$ (chloroform), ultraviolet absorption maximum at 242 mu, from 2,4-dibromoandrostan-3,17-dione and 2-iodotestosterone 17-hexahydrobenzoate, polymorphic forms melting at 136° C. and 157° C. $[\alpha]_D^{20} + 81.8°$ (chloroform) from 2,4-dibromoandrostan-17-ol-3-one 17-hexahydrobenzoate.

*Example VI*

A mixture of 0.5 g. of 2-iodo-Δ⁴-androstene-3,17-dione of Example V, 30 cc. of ethanol, 7 cc. of dioxane and 5 g. of zinc dust was boiled for seven hours. Filtration, evaporation of solvents and trituration with hexane afforded Δ⁴-androstene-3,17-dione of M. P. 167–169° C. The same product was obtained when the 2-iodo-Δ⁴-3-ketone was refluxed with collidine according to the procedure of Examples II and IV. The same results were also observed when collidine was replaced by dimethylaniline or pyridine.

*Example VII*

A solution of 1.00 g. of 2-iodo-17α-hydroxyprogesterone of Example V in 50 cc. of acetone was treated in an atmosphere of carbon dioxide with a solution of chromous chloride prepared from 20 g. of amalgamated zinc dust, 15 cc. of water, 20 cc. of concentrated hydrochloric acid and 7.6 g. of chromic chloride. After two minutes, the solution was diluted with water to complete precipitation of the product. After digestion with ether, filtration yielded 17α-hydroxyprogesterone with M. P. 218–221° C. (when inserted at 205° C.), $[\alpha]_D^{20} + 105°$ (acetone), ultraviolet absorption maximum at 240 mu (log $E=4.14$).

*Example VIII*

This example illustrates how the conversion of a 3-ketoallosteroid to the Δ⁴-3-ketone can be accomplished without isolation of intermediates:

A solution of 2.0 g. of allopregnane-3,20-dione-17α,21-diol 21-acetate M. P. 253° C. $[\alpha]_D^{20} + 63.3°$ (chloroform) in 400 cc. of glacial acetic acid was treated with 21.7 cc. of a bromine acetic acid solution containing 76 mg. of bromine per cc. After addition of a few drops of 4 N hydrogen bromideacetic acid solution, the clear solution was allowed to stand for four hours in order to complete the rearrangement of the intermediate 2,2-dibromo derivative to the 2,4-isomer. After dilution with much water, the product was extracted with ether, the organic layer was washed until neutral, dried and evaporated. The residue was boiled with 100 cc. of acetone and 3.2 g. of sodium iodide for six hours, diluted with water and extracted with chloroform. After drying and evaporating, the residue was treated with zinc dust in accordance with the procedure of Example VI and after the usual work-up followed by chromatography over alumina and elution with benzene-chloroform mixtures, there was obtained readily Δ⁴-pregnene-3,20-dione-17α,21-diol 21-acetate having a M. P. of 236–238° C. $[\alpha]_D^{20} + 122°$ (acetone).

It will be obvious to those skilled in the art that various changes may be made without departing from the spirit of the invention and therefore the invention is not limited to what is described in the specification but only as indicated in the appended claims.

We claim:
1. A process for the production of 2-iodo-3-ketosteroids selected from the class consisting of 2-iodo-4-bromo-3-ketoallosteroids and 2-iodo-Δ⁴-ketosteroids, which comprises heating a 2,4-dibromo-3-ketoallosteroid with an alkali metal iodide.

2. A process for the production of 2-iodo-3-ketosteroids selected from the class consisting of 2-iodo-4-bromo-3-ketoallosteroids and 2-iodo-Δ⁴-3-ketosteroids, which comprises dissolving a 2,4-dibromo-3-ketoallosteroid in a lower aliphatic ketone solvent therefor and heating said solution with an alkali metal iodide.

3. The process for the production of a 2-iodo-4-bromo-3-ketoallosteroid, which comprises dissolving a 2,4-dibromo-3-ketoallosteroid in a lower aliphatic ketone solvent therefor and heating said solution with an alkali metal iodide for a period less than substantially three hours.

4. A process for the production of a 2-iodo-Δ⁴-3-ketosteroid, which comprises dissolving a 2,4-dibromo-3-ketoallosteroid in a lower aliphatic ketone solvent therefor and heating said solution with an alkali metal iodide for a period more than substantially three hours.

5. A process for the production of a ring A saturated 3-ketoallosteroid, which comprises reacting a 2-iodo-3-ketoallosteroid with a tertiary amine.

6. A process for the production of a Δ⁴-3-keto-steroid, which comprises reacting a 2-iodo-4-bromo-3-ketoallosteroid with a tertiary amine.

7. A process for the production of a Δ⁴-3-ketosteroid, which comprises reacting a 2-iodo-Δ⁴-3-ketosteroid with a tertiary amine.

8. A process for the production of a 3-ketoallosteroid, which comprises reacting a 2-iodo-3-ketoallosteroid with a reducing agent.

9. A process for the production of a Δ⁴-3-ketosteroid, which comprises reacting a 2-iodo-Δ⁴-3-ketosteroid with a reducing agent.

10. A process for the preparation of a Δ⁴-3-ketosteroid, which comprises reacting a 3-ketoallosteroid with two moles of bromine in the presence of hydrogen bromide to prepare a 2,4-dibromo-3-ketoallosteroid reacting the resulting 2,4-dibromide-3-ketoallosteroid with alkali metal iodide to produce the corresponding 2-iodo-Δ⁴-3-ketosteroid and finally reacting the 2-iodo-Δ⁴-3-ketosteroid with a reducing agent.

11. A process for the production of a 2-iodo-3-ketosteroid which comprises heating a 2-bromo-3-ketoallosteroid with an alkali metal iodide.

12. A new compound consisting of 2-iodotestosterone-17-hexahydrobenzoate.

13. A new compound consisting of 2-iodo-Δ⁴-androstene-3,17-dione with M. P. 126–129° C. (with decomposition) $[\alpha]_D^{20} + 137.6°$.

14. A new compound consisting of 2-iodo-17α-hydroxyprogesterone with M. P. 110–115° C. (with decomposition) $[\alpha]_D^{20} + 71.0°$.

References Cited in the file of this patent

UNITED STATES PATENTS

| | | |
|---|---|---|
| 2,311,638 | Butenandt | Feb. 23, 1943 |
| 2,340,388 | Inhoffen et al. | Feb. 1, 1944 |

FOREIGN PATENTS

| | | |
|---|---|---|
| 220,922 | Switzerland | Aug. 1, 1942 |
| 228,433 | Switzerland | Nov. 16, 1943 |

OTHER REFERENCES

Fieser et al., Natural Products Related to Phenanthrene, 3rd ed., page 425 (1949).

Inhoffen, Ber. 76B, 233–45 (1943).